United States Patent [19]

Kelly et al.

[11] Patent Number: 5,698,252

[45] Date of Patent: Dec. 16, 1997

[54] TOPICAL APPLICATION OF PARTICULATES FOR PRODUCTION OF REDUCED FAT, LOW FAT, AND NO-FAT BAKED GOODS AND SNACKS

[75] Inventors: James W. Kelly, Douglasville, Ga.; Joseph A. Szwerc, Mahwah, N.J.; Robert M. Sauer, Jr., West Milford, N.J.; Juan A. Menjivar, Denville, N.J.; Lisa Alfieri, Glen Ridge, N.J.; John M. Kaiser, Livingston, N.J.

[73] Assignee: Nabisco Technology Company, Wilmington, Del.

[21] Appl. No.: 454,985

[22] Filed: May 31, 1995

[51] Int. Cl.⁶ ............................................. A23B 00/00
[52] U.S. Cl. .................... 426/289; 426/96; 426/293; 426/295; 426/560; 426/650; 118/19; 118/20; 118/303; 118/308; 366/180.1; 99/483; 99/494; 99/516; 99/534
[58] Field of Search ..................... 426/94, 96, 99, 426/289, 293, 295, 305, 443, 446, 560, 650; 118/19, 20, 311, 303, 308, 310; 366/24, 25, 180.1; 99/473, 474, 483, 494, 516, 534

[56] References Cited

U.S. PATENT DOCUMENTS

| | | | |
|---|---|---|---|
| 2,402,986 | 7/1946 | Cunning | 118/13 |
| 2,844,469 | 7/1958 | Melnick et al. | 426/116 |
| 3,049,750 | 8/1962 | Austin | 425/222 |
| 3,198,655 | 8/1965 | Gisiger | 427/212 |
| 3,408,980 | 11/1968 | Benson | 118/19 |
| 3,484,250 | 12/1969 | Vollink et al. | 426/293 |
| 3,527,646 | 9/1970 | Scheick et al. | 426/289 |
| 3,556,411 | 1/1971 | Nord et al. | 239/581.1 |
| 3,557,718 | 1/1971 | Chivers | 426/296 X |
| 3,647,147 | 3/1972 | Cook | 239/599 |
| 3,659,787 | 5/1972 | Ito | 239/708 |
| 3,661,605 | 5/1972 | Rubin et al. | 106/244 |
| 3,919,969 | 11/1975 | Leverett | 118/13 |
| 4,038,422 | 7/1977 | Keyser et al. | 426/72 |
| 4,079,151 | 3/1978 | Schade et al. | 426/96 |
| 4,168,919 | 9/1979 | Rosen et al. | 366/173.2 |
| 4,192,418 | 3/1980 | Montgomery | 198/659 |
| 4,301,763 | 11/1981 | Goldstone et al. | 118/308 |
| 4,335,149 | 6/1982 | Stipp | 426/386 |
| 4,346,849 | 8/1982 | Rood | 239/597 |
| 4,367,242 | 1/1983 | Jarvis et al. | 426/293 |
| 4,419,953 | 12/1983 | Fowler | 118/16 |
| 4,430,003 | 2/1984 | Beattie et al. | 366/137.1 |
| 4,431,678 | 2/1984 | Sollich | 426/306 |
| 4,477,483 | 10/1984 | Lewis | 427/8 |

(List continued on next page.)

Primary Examiner—Milton Cano

[57] ABSTRACT

The amount of oleaginous or aqueous liquid carrier used as an adhesive or binding agent for the topical application of a particulate composition to the major surfaces of baked good pieces or snack pieces is reduced by separately spraying the liquid composition and dispensing the particulate composition in substantial side-by-side relationship within a rotating drum. The liquid composition causes the particulate composition to adhere to the pieces prior to and without substantial penetration of the liquid composition into the pieces. Highly porous or absorptive products such as reduced fat, low fat, or no-fat crackers or snacks may be transferred hot to the drum. The liquid composition is sprayed substantially coextensively but separately from the dispensing of the particulate composition. The particulate curtain and the liquid spray both extend in the direction of transport of the pieces. The pieces are contacted sequentially by the liquid composition and the particulate composition several times as the pieces are driven up the side of the rotating drum and tumble downwardly as they travel through the drum. The resulting alternating layers of particulate and adhesive compositions promote strong binding of the particulates to the substrate while creating an appearance of visually apparent discrete particulate particles. The products may be dried in the drum by passing heated air through apertures in the wall of the drum. Reduced fat, low fat, and no-fat products having particulate toppings adhered to their top and bottom major surfaces may be produced.

23 Claims, 4 Drawing Sheets

U.S. PATENT DOCUMENTS

| | | | |
|---|---|---|---|
| 4,504,502 | 3/1985 | Earle et al. | 426/293 |
| 4,543,907 | 10/1985 | Fowler | 118/19 |
| 4,576,108 | 3/1986 | Socola et al. | 118/19 |
| 4,614,162 | 9/1986 | Ryan et al. | 118/19 |
| 4,640,837 | 2/1987 | Coleman et al. | 426/94 |
| 4,658,708 | 4/1987 | Rastoin | 99/323.9 |
| 4,762,725 | 8/1988 | Player et al. | 426/582 |
| 4,801,465 | 1/1989 | Sponer | 426/116 |
| 4,831,959 | 5/1989 | Turner | 118/303 |
| 4,834,996 | 5/1989 | Fazzolare et al. | 426/302 |
| 4,910,031 | 3/1990 | Budd et al. | 426/96 |
| 4,913,919 | 4/1990 | Cornwell et al. | 426/94 |
| 4,960,600 | 10/1990 | Kester et al. | 426/310 |
| 4,981,707 | 1/1991 | Morris | 426/93 |
| 4,985,269 | 1/1991 | Irvin et al. | 426/560 |
| 5,085,877 | 2/1992 | Youcheff et al. | 426/100 |
| 5,090,593 | 2/1992 | Ejike | 222/1 |
| 5,100,683 | 3/1992 | Singer et al. | 118/19 X |
| 5,120,559 | 6/1992 | Rizvi et al. | 426/446 |
| 5,130,150 | 7/1992 | Averbach | 426/99 |
| 5,135,766 | 8/1992 | Hermsen et al. | 426/427 |
| 5,160,016 | 11/1992 | Moksnes | 198/533 |
| 5,195,454 | 3/1993 | Wadell | 118/16 |
| 5,202,137 | 4/1993 | Duffy et al. | 426/89 |
| 5,225,222 | 7/1993 | Cha et al. | 426/89 |
| 5,238,494 | 8/1993 | Dunajtschik | 118/19 |
| 5,275,830 | 1/1994 | Smith | 426/93 |
| 5,275,831 | 1/1994 | Smith et al. | 426/93 |
| 5,298,268 | 3/1994 | Maegli | 426/93 |
| 5,316,195 | 5/1994 | Moksnes et al. | 222/146.6 |
| 5,372,826 | 12/1994 | Holtz et al. | 426/93 |
| 5,385,086 | 1/1995 | Burns et al. | 99/451 |
| 5,386,939 | 2/1995 | Ruegg | 239/7 |
| 5,401,518 | 3/1995 | Adams et al. | 426/89 |
| 5,417,992 | 5/1995 | Rizvi et al. | 426/283 |
| 5,433,961 | 7/1995 | Lanner et al. | 426/93 |
| 5,435,430 | 7/1995 | Steiner et al. | 198/370.05 |
| 5,443,964 | 8/1995 | Norman et al. | 426/303 |
| 5,514,399 | 5/1996 | Cordera et al. | 426/295 |
| 5,520,457 | 5/1996 | Gontero et al. | 366/228 |
| 5,520,942 | 5/1996 | Sauer, Jr. et al. | 426/289 |
| 5,531,826 | 7/1996 | Fusejima et al. | 118/19 |
| 5,538,747 | 7/1996 | Mueller | 426/507 |
| 5,554,221 | 9/1996 | Center et al. | 118/19 |

TOPICAL APPLICATION OF PARTICULATES FOR PRODUCTION OF REDUCED FAT, LOW FAT, AND NO-FAT BAKED GOODS AND SNACKS

FIELD OF THE INVENTION

This invention relates to apparatus and methods for the topical application of particulate compositions, such as seasonings, to baked good pieces and snacks using a liquid adhesive or binding agent. The invention also relates to the production of reduced fat, low fat, and no-fat seasoned baked goods and snacks.

BACKGROUND OF THE INVENTION

In the mass production of baked goods such as crackers or savory snacks, topping materials may be continuously applied to a dough sheet or dough pieces prior to baking to promote adhesion of the particulate composition to the moist dough. However, in the pre-baking application of toppings, it is generally only practical to coat only one side of the product because of the conventional transfer of doughs on flat conveyor belts to and through a continuous oven. Furthermore, heat-sensitive seasonings may be adversely affected in terms of flavor, appearance, or texture by the baking process. The post-baking application of toppings avoids the destruction of heat sensitive ingredients. However, the application of toppings to baked goods while they are on a conveyor belt still only achieves a one-sided coating.

In either the pre-baking or post-baking topical application of particulate compositions, the compositions are generally dispensed by a dispenser which extends across the conveyor belt or band. This arrangement dispenses particulate topping compositions, such as salt, in a relatively narrow band across the belt so as to coat the dough or baked good product below. However, dispensing a particulate composition upon a product while it is being conveyed on a conveying band generally results in the wasting of product unless the substrate is in sheet form or the pieces are closely spaced so that the particulate ingredient falls primarily upon the intended substrate.

Furthermore, the topical application of particulate ingredients which are sufficiently light, fine, or of low specific gravity so as to become airborne upon dispensing presents additional problems. For example, the escape of airborne particulates to the bakery atmosphere is wasteful. Also, the airborne particulates may be undesirably incorporated into or onto other baked goods which may be under production in a nearby bakery line. Vacuum hoods may be used to collect airborne particulates. However, such systems may be difficult to adapt to or configure to a conveyor belt system with high collection efficiency. In addition, the application of a vacuum to the dough prior to baking or just after baking may cause undesirable surface drying or moisture gradients which can adversely affect texture and appearance, or which can cause checking.

Toppings may be applied to both sides of a baked good by tumbling the baked good pieces while dispensing the topping upon the pieces. For example, inclined, rotating drums may be used to transport and tumble baked good pieces while dispensing a topping material thereupon. This type of system is generally used in conjunction with an oil based topping which is readily sprayed onto the pieces. However, when oil is used as a carrier for an additive, the amount of oil used is generally substantially more than is needed to provide adhesion of the additive to the substrate. In addition to providing adhesion, the carrier amount should be sufficient to carry the additive and to distribute the additive evenly on both sides of the substrate. Furthermore, combining the carrier with the additive prior to application to the substrate results in loss of independent control over the amount of carrier or adhesive and the amount of the additive.

Another problem encountered with the inclusion of particulates in the liquid carrier or liquid adhesive composition, whether aqueous or oil based, is that it tends to result in excessive clogging of spray nozzles. Also, combining the carrier or adhesive with the additive often results in bleeding of color components of the particulates into the carrier and vice-versa. This phenomenon results in a coated appearance and a loss of the visual impact of discrete, visually apparent particulates.

The baked goods or snacks may first be sprayed with an oil-based carrier or adhesive such as spray oil followed by the downstream application of a particulate ingredient. However, for porous substrates, such as baked goods and baked snacks, the oleaginous composition tends to soak into the substrate to a substantial degree before the particulates are applied thereby reducing binding or adhesion of the particulates to the substrate. Penetration of the liquid carrier into the baked substrate is particularly acute when the products are at an elevated temperature after baking because of increased substrate porosity. The addition of cooling equipment is generally not desirable because of additional equipment costs, additional floor space, and a tendency towards increased checking due to the creation of temperature gradients within the pieces.

Furthermore, loss of adhesion due to penetration of the liquid adhesive into the substrate results in loss of particulate ingredients. The lost particulates tend to accumulate in the rotating drum as well as in downstream packaging and conveying equipment. Excessive accumulation of the particulates necessitates shutdown of the continuous operation and cleaning of equipment.

To compensate for the loss of adhesion due to penetration of the liquid oleaginous composition into the substrate, higher amounts of the oleaginous composition are generally used to replenish the surface amount of adhesive. However, increasing the amount of the oil-based carrier or adhesive to compensate for substantial penetration into the substrate results in a substantial increase in fat content of the product.

Water may be used to replace oil as a spraying medium. However, water, like oil, penetrates the surface of the baked product to a substantial degree when applied upstream of the particulates. The use of excessive amounts of water, while helping to reduce the fat content, may result in adverse affects upon baked good texture and microbial stability. While excess water may be removed by further heating or drying, these additional steps may decompose or volatilize heat sensitive or volatile additives. The additional heating may also increase "checking" or breakage problems in baked goods and snacks, particularly in thin products such as chips. It may also adversely affect their flavor, color, appearance, or texture.

Baked good or snack tumbling and conveying with agitation of the pieces and of the topping composition may be achieved with conveyors equipped with counterrotating conveyor brushers. While the counterrotating conveyor brushes efficiently distribute particulate toppings on to the tops and bottom surfaces of the pieces, the application of a liquid adhesive or liquid carrier while the pieces are being conveyed by the brushes tends to result in excessive adhesion of the particulates to the brushes.

The present invention provides an apparatus and method for the topical application of a particulate composition, such as a seasoning, substantially uniformly to the top surface and to the bottom surface of baked good pieces, such as crackers, biscuits, and wafers, and sweet or savory snacks such as fabricated potato chips, tortilla chips, and corn chips. The substantially uniform coating of the individual pieces with particulates which are adhered to the baked good pieces is achieved with reduced amounts of oil-based liquid carriers. Smaller amounts of oil-based or water-based adhesives may be used without loss of binding or adhesion of the particulates to the baked good pieces or snacks. The methods and apparatus of the present invention may be used to obtain no-fat, low fat, and reduced fat foods having visually apparent, substantially discrete, particulate additives adhered to their top and bottom surfaces. The apparatus and process provides for the topical application of particulates on a mass production, continuous basis, with little or no waste of particulate composition and without substantial contamination of downstream conveyor equipment and packaging equipment. Furthermore, flavor, appearance, and texture of heat-sensitive toppings are not adversely affected in the process of the present invention. Granulated products, such as cheese powder, onion and garlic, and dried pepper seasonings may be continuously adhered to baked goods and baked snacks to obtain consistent, uniform, coverage without substantial particulate waste or contamination of or accumulation upon equipment.

SUMMARY OF THE INVENTION

The present invention provides an apparatus and method for reducing the amount of liquid oleaginous carrier used as an adhesive or binding agent for the topical application of a particulate composition to opposing major surfaces of baked good pieces or snack pieces. The amount of liquid adhesive or binder is reduced by separately spraying the liquid composition and dispensing the particulate composition in substantial side-by-side relationship within a rotating drum. The side-by-side spraying and dispensing is performed so that the adhesive composition causes the particulate composition to adhere to the top and bottom surfaces of the baked good pieces or snack pieces prior to and without substantial penetration of the liquid adhesive composition into the pieces. Substantially uniform coating of both the tops and bottoms of a plurality of baked good or snack pieces with the particulate composition adhere thereto is achieved on a consistent, continuous, mass production basis.

In embodiments of the present invention, the baked good pieces or baked snack pieces may be transferred directly from a multi-zone, continuous band oven to the rotating drum for the application of both the edible liquid adhesive composition and the particulate composition. The liquid adhesive composition may be a liquid oleaginous composition such as topping oil or an aqueous-based composition such as an aqueous solution of maltodextrin, food starch, gums, or hydrocolloids, or mixtures thereof. The baked pieces may be transferred to the rotating drum from the oven without cooling for application of the adhesive and particulates while the pieces are at elevated temperatures, such as about 90° F. to about 190° F. or higher.

The liquid adhesive composition is sprayed upon the tops and bottoms of the baked good pieces or snack pieces as they are tumbled and transported from the inlet of the inclined rotating drum towards the outlet of the drum. In preferred embodiments, a plurality of nozzles are arranged longitudinally along a portion of the length of the drum for spraying the liquid adhesive composition as a spray having a longitudinal axis which extends substantially parallel to the longitudinal axis of the rotating drum.

The particulate dispenser or metering device dispenses the particulate composition as a curtain or sheet. The curtain or sheet descends upon the tops and bottoms of the baked good pieces or snack pieces along a substantial portion of the length of the drum as the pieces are tumbled and transported by rotation of the drum. The curtain or sheet of particulate composition extends for a substantial distance along the longitudinal axis of the rotatable drum. In embodiments of the invention, the curtain or sheet of particulate composition and the spray of liquid adhesive composition may each extend a distance of at least about 20%, generally about 25% to about 60% of the length of the rotatable drum. In embodiments of the invention, the particulate nozzle and the liquid adhesive sprayer are coextensive so as to provide a particulate curtain and a liquid spray which are at least about 50%, preferably at least about 70% coextensive in length.

In preferred embodiments, the liquid adhesive spray nozzles are supplied from a common or single source with the nozzles being oriented for spraying the pieces so that the liquid adhesive spray contacts the tumbling pieces without substantially contacting or disrupting the curtain of particulate topping as it descends upon the tumbling pieces. The rotation of the drum and a plurality of longitudinal vanes or baffles on the inside surface of the drum causes the baked good pieces or snack pieces to ride up the inside surface of the drum a substantial distance before tumbling down towards the bottom-most circumferential portion of the drum. This motion is repeated numerous times as the pieces are transported from the inlet to the outlet of the rotating drum. In preferred embodiments of the invention, the particulate nozzle and the liquid adhesive nozzles are oriented so that the curtain of particulate topping is dispensed upon the pieces when they are at lower circumferential positions than when the liquid adhesive is sprayed onto the pieces. This arrangement helps to provide a plurality of layers of adhesive composition and a plurality of layers of particulate composition wherein a layer of particulate composition alternates with a layer of adhesive composition. This promotes strong binding of the particulates to the substrate while creating an appearance of visually apparent discrete particulate pieces.

A preferred dispenser nozzle comprises a tubular member which includes a feed screw for transporting the particulate composition through the tubular member from one end to the other. The tubular member may contain inner slots or passageways along its bottom. Mass flow rate adjustment of the particulate composition may be achieved by the use of individually adjustable rotatable sleeves each having an outer slot or passageway. Rotation of the individual sleeves rotates its outer slot relative to the inner slot so that the width of the inner slot which is covered by the sleeve is varied, thereby controlling mass flow through each nozzle opening.

In embodiments of the invention, the rotatable drum may contain apertures or openings along its length and around its periphery. Air may be forced through the apertures by means of an inlet and/or outlet fan into the interior of the rotatable drum for drying of the pieces as they are tumbled. Continuous air drying while the pieces are being tumbled and coated may be used, for example, when aqueous based adhesive compositions are utilized.

The apparatus of the present invention may be used to provide particulate coatings, such as seasonings, spices, herbs, dried or dehydrated vegetable flakes, cheese powder, flavorings, colorants, and odorants to baked good pieces or snacks. Exemplary of baked goods or snacks which may be produced in accordance with the present invention are crackers, biscuits, wafers, chips, or fabricated chip-like snacks, including no-fat, reduced-fat, and low-fat varieties thereof.

DETAILED DESCRIPTION OF THE INVENTION

Reductions in the amount of liquid oleaginous carriers and binding agents for the topical application of particulates to both sides of baked good or snack pieces is achieved in accordance with the present invention. A liquid binding agent or liquid adhesive is sprayed substantially coextensively, but separately from the dispensing of the particulate composition as a curtain or sheet upon the pieces. The side-by-side application is performed as the pieces are both tumbled and transported by an inclined rotating drum equipped with longitudinal vanes or baffles. The particulate curtain or sheet and the liquid spray both extend in the direction of transport of the pieces for a substantial distance so as to avoid a concentrated area of introduction of the adhesive and particulate compositions to the substrate pieces.

Consistently, substantially uniform coverage of the top and bottom surfaces of substantially all pieces may be achieved on a continuous mass production basis while avoiding color bleed from the particulates to the liquid adhesive. The particles of the particulate topping composition may be adhered to the baked pieces in a visually apparent discrete state to provide a three dimensional or topographically varying appearance rather than a flat coated appearance. In embodiments of the invention, the particulate curtain and the spray curtain do not come into substantial contact as they descend upon the tumbling pieces so as to avoid substantial disruption of the particulate curtain. The side-by-side or substantially coextensive curtains of particulates and liquid spray causes the particulates to adhere to the baked good or snack pieces before the adhesive composition has time to substantially penetrate into the interior of the pieces. This reduces the amount of liquid adhesive or liquid binder needed for particulate adhesion to the major surfaces of the pieces. Reduced fat, low fat and no-fat baked goods and snacks having particulate toppings adhered to their top and bottom surfaces may be produced in accordance with the present invention.

The apparatus and method of the present invention may be used for topically applying a particulate composition substantially uniformly to both the top and bottom surfaces of farinaceous based or starch based foods. The food substrates may be baked good pieces, such as crackers, biscuits, wafers, crisp breads, and sweet or savory snacks, such as pretzels, snack mixes, chips, or chip-like products such as fabricated potato chips, pretzel chips, tortilla chips, corn chips, and the like. The snacks may be extruded or expanded snacks, such as cheeseballs and breadsticks. The snack substrates which may be topped in accordance with the present invention may be baked, microwaved, fried, toasted, or combinations thereof prior to the application of adhesive and particulates. The chip-like snacks may be produced from vegetable slices or fabricated from a dough. The substrates may be full fatted products, reduced fat, low-fat, or no-fat products such as reduced fat crackers, low-fat potato chips, low-fat tortilla chips, no-fat crackers, and the like.

As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers, or biscuits or wafers, used as snacks, and for chips, the reference amount is 30 grams. Thus, the fat content of a low-fat chip, snack, cracker, or wafer, would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product. A no-fat chip, snack, or wafer having a label serving size of 28 grams would have a fat content of less than 0.5 grams per 28 grams or less than about 1.79% by weight, based upon the weight of the final product.

Exemplary particulate compositions which may be topically applied to the baked good or snack pieces in accordance with the present invention include flavorings, seasonings, condiments, colorants, odorants, confections, and mixtures thereof. The toppings may be heat sensitive ingredients such as vitamins, medicaments, minerals, nutritive supplements, dried vegetables, herbs, spices, and mixtures thereof. The particulate compositions may be in coarse, medium or finely granulated form, powdered form, seed form, crumb form, or low specific gravity forms such as dried vegetable flakes, herb flakes, condiment flakes, or fruit flakes, and mixtures thereof. A substantial portion of the particles of the toppings such as the granules, powder, or flakes may be readily visually apparent as discrete particles upon the finished product.

Exemplary toppings may include one or more granulated ingredients such as salt, salt substitutes, onion salt, garlic salt, sweeteners or sugars, and decorative toppings, alone or in combination with flakes such as pepper, basil, thyme, peppermint, dried tomato, bran, parsley, and mixtures thereof. Exemplary of a topping composition which may be used for crackers is an onion/garlic/parsley seasoning having a particle size distribution of about 75% passing through a

40 Tyler mesh, and having a bulk density of about 40 lbs./cu.ft. Exemplary powdered toppings include cheese powders, or granules, such as Nacho cheese or cheddar cheese seasoning powders, and barbecue, ranch, honey-mustard, sour cream and onion seasoning powders or flavors, and sweeteners such as crystalline sucrose, fructose, and the like.

Exemplary particle size distributions may be at least about 15% by weight being retained on a #40 Tyler mesh screen. Exemplary bulk densities may range from about 25 to about 55 lbs./cu.ft.

The moisture content of the particulate toppings or seasonings is generally less than about 10% by weight, most often less than about 5% by weight, preferably less than about 3% by weight. The baked good or snack pieces to which the toppings and liquid adhesive or liquid binding agent are applied generally have a moisture content of less than about 5% by weight, preferably less than about 3% by weight.

Oleaginous-based binding agents or adhesives which may be used in the sprays in accordance with the present invention may be any edible fat or oil or mixture thereof and may include conventional food-grade emulsifiers. Vegetable oils, lard, marine oils, and mixtures thereof which are fractionated, partially hydrogenated, and/or interesterified are exemplary of the shortenings or fats which may be used in the present invention. Soybean spray oil, for example, may be used as a liquid adhesive in embodiments of the invention. Edible reduced or low calorie, or non-digestible fats, fat substitutes, or synthetic fats which are process compatible may also be used. The shortenings or fats may be solid or fluid at room temperatures of from about 75° F. to about 90° F. The shortening or fat may be heated to liquefy it and to reduce its viscosity for spraying without clogging of spray nozzles.

Exemplary emulsifiers which can be used in the sprays include lecithin, sorbitan monostearate, mono- and/or di-glycerides, polyoxyethylene sorbitan fatty acid esters, such as polysorbates (e.g., polyoxyethylene (20) sorbitan monostearate), and sodium stearoyl-2-lactylate. Exemplary amounts are up to about 3% by weight of one or more emulsifiers based upon the weight of the final coated product.

In embodiments of the invention an aqueous-based edible liquid binding agent or edible liquid adhesive may be utilized. Generally the binding agent or adhesive should provide good adhesion of the particulates to the substrate without adversely affecting or overpowering the visual appearance, texture, or taste of the particulate topping. Exemplary of preferred aqueous-based liquid binding agents or adhesives which may be used are maltodextrin solutions and aqueous solutions of a water soluble modified food starch, a water soluble gum, a water soluble hydrocolloid, and mixtures thereof. In embodiments of the invention, the maltodextrin may have a DE value of from about DE 1 to DE 100, preferably from about DE 10 to DE 25. Exemplary commercially available maltodextrins which can be used include STAR DRI 10, STAR DRI 15, and STAR DRI 20, which are derived from waxy maize. They have DE values of approximately 10.5, 15.5 and 21.5, respectively, and are produced by A. E. Staley Manufacturing Company. Amaizo's FRODEX 10 (DE of about 10) LODEX 10 (DE of about 11), FRODEX 15 (DE of about 18), and LODEX 15 (DE of about 18) all derived from waxy maize are exemplary of other maltodextrins which may be dissolved in water for spraying in accordance with the present invention. A water soluble modified food starch which can be used to form an aqueous-based sprayable, liquid adhesive composition is N-TAC sold by National Starch.

Other process and product compatible conventional or known edible aqueous binding or adhesive compositions may also be used such as sugar solutions, and water soluble gums. Known food grade adhesive compositions are disclosed, for example, in U.S. Pat. No. 3,527,646 to Scheik, U.S. Pat. No. 4,504,502 to Earle, et al., U.S. Pat. No. 4,910,031 to Budd, et al, U.S. Pat. No. 4,913,919 to Cornwell, et al, U.S. Pat. No. 4,981,707 to Morris, U.S. Pat. No. 5,275,830 to Smith, U.S. Pat. No. 5,275,831 to Smith, et al., and U.S. Pat. No. 5,298,268 to Maegli.

The concentration of the solid binding or adhesive agent in the liquid solution used and the amount of liquid solution applied depends upon the substrate, the adhesive or binder, the particulate topping composition, production rates, and the amount of particulate coverage desired. It is generally preferred to use a high concentration of solids so as to reduce the amount of drying. However, excessively high solids concentrations tend to result in spray nozzle clogging, too much gloss, or a laminated appearance. Exemplary concentrations of the solid binding or adhesive agent, such as a maltodextrin or water soluble modified starch which may be used range from about 10% by weight to about 55% by weight solids, based upon the total weight of the liquid binding agent or liquid adhesive agent. Preferred concentrations of the dissolved solid agent range from about 20% by weight to about 35% by weight, most preferably from about 25% by weight to about 30% by weight, based upon the total weight of the liquid binding or adhesive agent.

The amount of liquid binder or liquid adhesive composition applied to the substrate, or the spray rate, should be sufficient to hold at least substantially all of the applied particulate topping or seasoning through packaging operations, transit, and at least about three months, preferably at least about six months of shelf life. Exemplary amounts of aqueous based liquid binder or oleaginous-based liquid binder applied to the baked good or snack substrate may range from about 1% by weight to about 40% by weight, preferably from about 5% by weight to about 20% by weight, based upon the weight of the snack or baked good substrate.

The particulate topping composition is applied to the baked good or snack substrate in effective amounts which generally range from about 0.5% by weight to about 15% by weight, based upon the weight of the final topped product.

Figure 1:
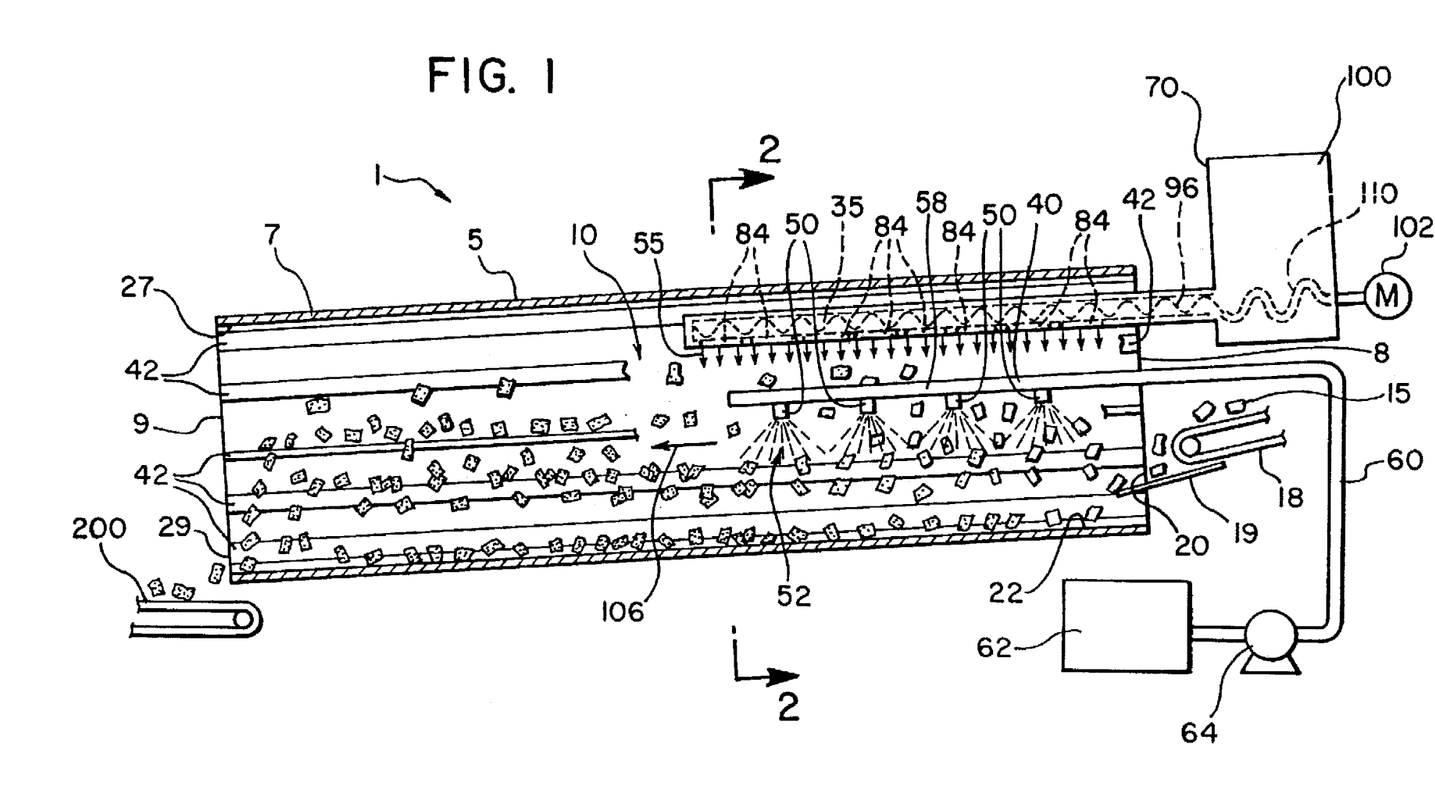
FIG. 1 is a schematic side view of apparatus for the topical application of liquid adhesive and particulate compositions to baked goods and snacks in accordance with the present invention.
Figure 2:
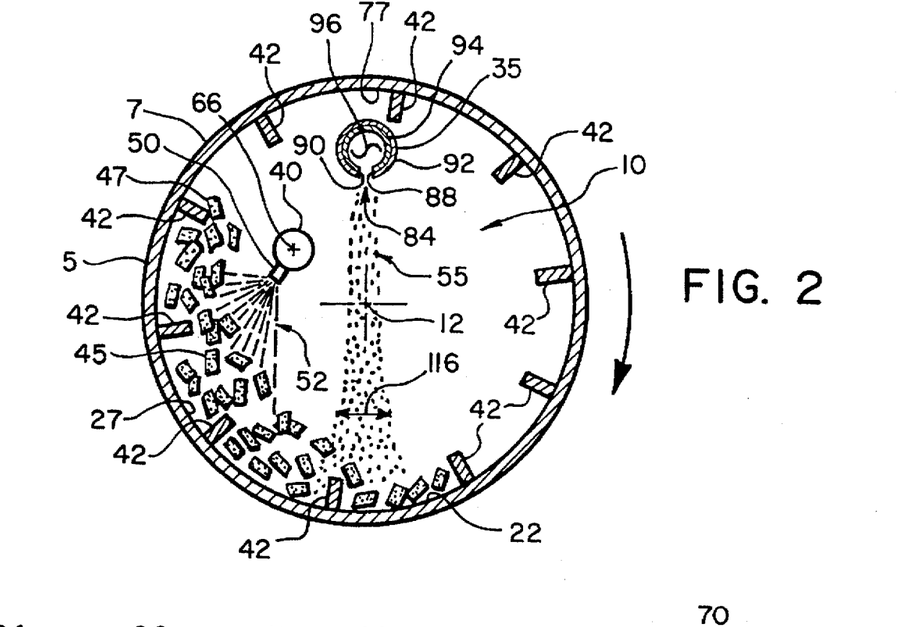
FIG. 2 is an enlarged, schematic cross-sectional view of the rotary drum of the apparatus along line 2—2 of FIG. 1.

As shown in FIGS. 1 and 2, the apparatus 1 for applying a liquid adhesive or binding composition and a particulate topping composition in accordance with the present invention comprises an inclined rotatable drum 5 comprising a cylindrical wall 7, an open inlet end 8, and open outlet end 9. In the embodiment shown in FIGS. 1 and 2, the cylindrical wall 7 is imperforate. The cylindrical wall 7 forms a longitudinal cavity 10 within the drum 5 having a central longitudinal axis 12. The baked good or snack pieces 15 to be topped or coated with the liquid adhesive and particulate compositions may be directly supplied from an oven (not shown) to a continuous conveyor belt 18. The conveyor belt 18 may then transfer the pieces 15 to a vibratory conveyor 19 which feeds the pieces into the drum inlet 20. The vibratory conveyor 19 is preferably disposed near the bottom-most circumferential portion 22 of the rotating drum 5 so that the baked good or snack pieces 15 do not fall through a large distance upon entry into the drum 5.

The cylindrical cavity 10 formed by the inner cylindrical wall 27 extends between the inlet end 8 and the outlet end 9 of the drum 5. The outlet 29 for discharging the coated or topped pieces 15 from the cavity 10 is preferably located in the outlet end 9 of the rotary drum 5 as shown in FIG. 1. In embodiments of the present invention as shown in FIGS. 1 and 2, the cavity 10 is completely enclosed by the drum wall 7 except for the open inlet end 8 and open outlet end 9. In other embodiments, the inlet end 8 and/or the outlet end 9 may be closed by a stationary outer housing (not shown in FIG. 1) except for openings within the ends of the housing. The openings in the ends of the housing may be for ingress and egress of the baked good or snack pieces 15 and for the insertion of a particulate dispensing nozzle 35 and sprayer 40. The latter type of arrangement may be used to help reduce the escape of airborne particulates to the atmosphere.

Longitudinal vanes, ribs, or baffles 42 are mounted to the inside wall 27 of the rotatable drum 5. In preferred embodiments, the longitudinal vanes 42 are arranged substantially parallel to the central longitudinal axis 12 of the drum 5. The vanes 42 also preferably extend from the inlet end 8 to the outlet end 9 of the drum 5 and are substantially equally spaced around the inner wall 27 of the drum 5 as shown in FIGS. 1 and 2. The number of vanes or ribs 42 may, for example, range from about 4 to about 16. The ribs 42 may have a cross-section which is rectangular, square, L-shaped, or triangular in shape. Other conventional cross-sectional shapes and configurations for the rotating drum vanes 42 may also be used.

The longitudinal vanes 42, in conjunction with the inclined orientation of the drum 5 and the rotation of the drum about its central longitudinal axis 12 result in transporting and tumbling of the baked good or snack pieces 15 through the drum cavity 10 from the drum inlet 20 to the drum outlet 29. In embodiments of the invention, rotation of the drum 5 and the ribs 42 may cause the bed 45 of baked good or snack pieces 15 to extend from about the bottommost circumferential portion 22 of the drum 5 a substantial distance up the inside wall 27 as shown in FIGS. 1 and 2. In embodiments of the invention, the top or apex 47 of the bed 45 may be from about 15° to about 60° above the central longitudinal axis 12 of the drum 5.

As shown in FIGS. 1 and 2, the liquid adhesive or liquid binding agent sprayer 40 extends from the inlet end 8 a substantial distance along the length of the drum 5 towards the outlet end 9. The sprayer 40 comprises a plurality of nozzles 50 within the drum 5 for spraying a liquid adhesive composition or liquid binding agent upon the top and bottom surfaces of the pieces 15 as they are tumbled. The spray nozzles 50 are preferably evenly spaced in the longitudinal direction of the drum 5.

The spray nozzles 50 may be oriented for spraying the pieces 15 so that the liquid adhesive spray 52 contacts the tumbling pieces 15 without substantially contacting or disrupting the curtain 55 of particulate topping as the curtain 55 descends upon the tumbling pieces 15. The plurality of spray nozzles 50 are preferably aligned longitudinally as shown in FIGS. 1 and 2. However, arrangements wherein the spray nozzles 50 are each disposed at different angles with respect to the horizontal are contemplated.

In embodiments of the invention, the liquid adhesive spray nozzles 50 may be supplied with liquid by a straight pipe or manifold 58. The liquid spray nozzles 50 may be fed by separate feed lines, but use of a common feed line or manifold 58 is preferred. The supply line 60 for the nozzles may be mounted outside of the rotating drum 5 upon a moveable, height adjustable stand or other mounting device (not shown) for positioning the spray nozzles 50 within the drum 5. In the embodiment of FIG. 1, the spray nozzles 50 remain stationary while the drum 5 rotates about its longitudinal axis 12. The liquid adhesive or liquid binding agent, such as soybean spray oil, may be supplied from a tank 62 by means of a pump 64 or by gravity flow to the spray supply line 60.

In preferred embodiments, the spray nozzles 50 are disposed above, but to the side of the central longitudinal axis 12 of the drum 5. The longitudinal axis 66 of the sprayer 40 is preferably substantially parallel to the central longitudinal axis 12 of the rotating drum 5 so that the nozzles 50 provide a spray 52 having a central longitudinal axis which is substantially parallel to the central longitudinal axis 12 of the drum 5. As shown in FIG. 2, the sprayer 40 is preferably disposed on the side of the drum 5 upon which the bed 45 of baked good pieces or snack pieces 15 ride up and tumble down.

The liquid sprayer 40 may be a conventional spraying device equipped with nozzles 50 such as a Micrometer Liquid Applicator produced by Spray Dynamics of Irvine, Calif. Conventional spray devices which may be used include airless and air-assisted airless spray devices and electrostatic spray devices. Conventional spray nozzles and spray tips are disclosed, for example, in U.S. Pat. Nos. 3,556,411, 3,647,147, 3,659,787, 3,754,710, 3,907,202, 4,055,300, 4,097,000, 4,346,849, and 4,079,151. In preferred embodiments, the spray nozzles 50 provide atomization of the liquid adhesive or binding agent. In addition, in preferred embodiments, each atomizing nozzle 50 provides a conical spray pattern. The sprays from each nozzle 50 preferably combine into a substantially continuous longitudinal spray 52 which descends upon the tumbling pieces 15 to provide substantially uniform coating of the pieces 15. In other embodiments, the individual sprays may descend upon the pieces with gaps between the sprays.

The plurality of atomizing nozzles 50 may be equally spaced along the length of the liquid feed line 58. Generally, three or more atomizing nozzles 50 are spaced along the feed line 58 for providing a continuous spray 52.

Figure 3:
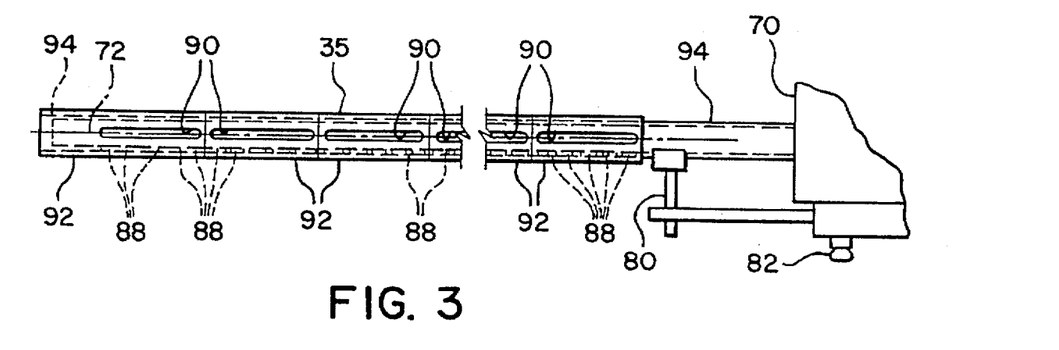
FIG. 3 is an enlarged, schematic partial side view of a particulate dispenser of FIG. 1 showing the dispenser nozzle.

The particulate dispenser 70 is mounted for dispensing the particulate composition curtain 55 in substantial side-by-side relationship to the liquid spray 52 within the rotating drum 5 as shown in FIGS. 1 and 2. The particulate dispenser nozzle 35 is preferably mounted at a higher location than the liquid spray nozzles 50. However, in embodiments of the invention, the liquid spray nozzles may be mounted at a higher position than the particulate dispenser nozzle. The longitudinal axis 72 of the particulate nozzle 35, as shown in FIGS. 1 and 2, may be substantially parallel to both the central longitudinal axis 12 of the drum 5 and the longitudinal axis 66 of the sprayer 40. The particulate composition is dispensed as a curtain or sheet 55 which extends in the direction of the central longitudinal axis 12 of the rotatable drum 5 so that it is dispensed upon the tumbling pieces 15 for a substantial distance along the longitudinal axis 12. As shown in FIGS. 1, 2, and 3, the particulate dispenser 70 comprises an elongated nozzle 35 which does not rotate with the drum 5. The nozzle 35 extends from outside the drum 5 through the inlet 20 of the drum 5 and along a substantial portion of the length of the drum 5.

The particulate nozzle 35 is preferably located or aligned directly above the central longitudinal axis 12 of the rotatable drum 5. This permits raising of the dispenser nozzle 35 to a location near the apex or uppermost circumferential portion 77 of the drum 5. Locating the dispenser nozzle 35 near the apex 77 provides a greater distance of travel for the particulates before contacting the baked good or snack pieces 15. The greater travel distance permits the curtain or sheet 55 of particulate composition to disperse in a direction transverse to the central longitudinal axis 12 of the drum 5 as the composition descends towards the baked goods or snack pieces 15. Height adjustment may be achieved by raising or lowering the nozzle 35 with respect to the rotatable drum 5. The nozzle 35 may be supported at its upstream end by means of a support bracket 80 as shown in FIG. 3. The particulate dispenser 70 may be mounted or supported on a portable table or platform (not shown). Height adjustment of the nozzle 35 within the rotatable drum 5 may be achieved by the use of adjustment legs 82 on the dispenser 70 or upon the movable platform or table (not shown).

Figure 4:
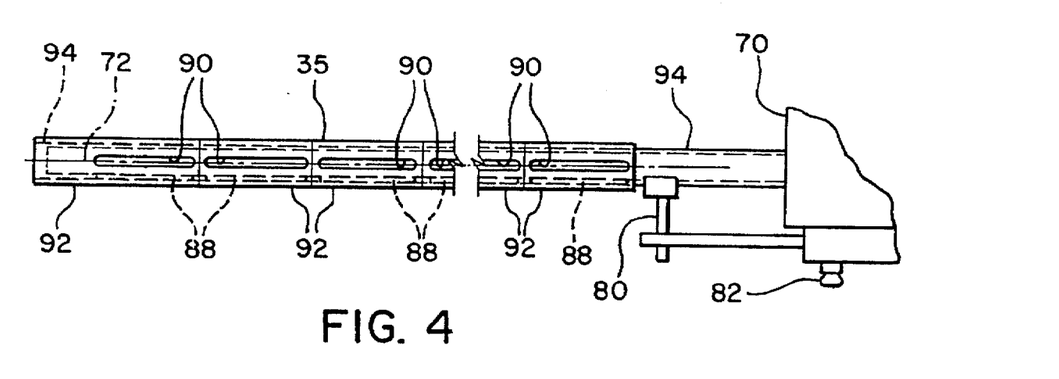
FIG. 4 is an enlarged schematic partial side view of a particulate dispenser having another embodiment of a dispenser nozzle for use in the apparatus of FIG. 1.

In preferred embodiments of the invention, the dispenser nozzle 35 includes a plurality of adjustable openings 84 along its length for providing a substantially uniform mass flow rate of particulate composition along the length of the curtain or sheet 55. The openings 84 are preferably located or aligned substantially directly above the central longitudinal axis 12 of the drum 5. As shown in FIGS. 3 and 4, the adjustable openings 84 may each comprise one or more inner slots or apertures 88 associated with an outer slot 90. In the embodiment of FIG. 3, a plurality of inner slots or apertures 88 are associated with each outer slot 90. In the embodiment of FIG. 4 only one inner slot 88 is associated with each outer slot 90. Each outer slot 90 may be located in an individually rotatable sleeve or collar 92. Rotation of the sleeve 92 and its slot 90 relative to the one or more inner slots 88 may be used to change the width of the inner slots or apertures 88 which are covered by the sleeve 92. The mass flow rate of the particulate composition through each nozzle opening 84 may therefor be varied by rotation of the sleeve or collar 92. The inner slots may be tear-drop shaped, circular, elliptical, rectangular, or square shaped, and the like.

The inner slots 88 are preferably located within a tubular member 94 which includes a feed screw, helix, auger, or pigtail feeder 96 for transporting the particulate composition to the inner slots 88 from a particulate feed hopper 100. The feed screw 96 transports the particulate composition through the tubular member 94 for dispensing through the adjustable openings 84. The feed screw 96 may be driven by a conventional direct or indirect motor drive 102. The particulate feed hopper 100, drive for the feed screw 96, and a portion of the tubular member 94 are located outside of the rotatable drum 5 as shown in FIG. 1. In the embodiment shown in FIG. 1 the particulate composition is fed through the nozzle 35 cocurrently to the direction of transport 106 of the substrate pieces 15 through the rotatable drum 5. The dispensing device 70 also preferably includes a feed hopper agitator 110 for assisting in the supply of a constant flow rate of the particulate composition to the feed screw 96.

Exemplary agitated feed hoppers for feeding granular material to a feed screw in the bottom of the hopper which may be used are disclosed in U.S. Pat. No. 5,160,016 to Moksnes. Commercially available dispensers which include a feed hopper and a nozzle having adjustable slotted openings for creating a curtain or sheet of particulate composition which may be used are produced by AccuRate, Inc., Whitewater, Wis. Venturi-style powder delivery systems, and Nordson electrostatic powder spray systems may also be used to dispense the particulate composition.

Generally, the inner apertures or slots 88 may have a width about equal to the width of the outer slots 90. The length of the inner slots or apertures 88 may be about equal to the length of the outer slot 90 as in the embodiment of FIG. 4 or smaller as in the embodiment of FIG. 3. For example, in the embodiment of FIG. 4 the outer nozzle slots 90 may have a width of about ⅜" and a length of about 4¾". The slots 90 in the outer sleeves 92 may be spaced about ¼" apart. The inner slots 88 of FIG. 4 may have the same dimensions and spacing as the outer slots 90. In other embodiments, a single elongated slot may be used in the inner tube 94, rather than a plurality of individual slots 88. The slot or slots 88 of the inner tube 94 preferably have their central longitudinal axes aligned along the bottommost portion of the cylindrical tube 104 as shown in FIGS. 3 and 4.

In the embodiments of FIGS. 3 and 4, even though the nozzle 35 contains individual slots 88, 90, they are closely spaced together so that the individual curtain from each slot 88, 90 disperses longitudinally so that a single sheet or curtain 55 of the particulate composition is formed a relatively short distance below the nozzle openings 84. As shown in FIG. 1, the sheet 55 extends substantially the entire length of the inclined nozzle 35. As the particulate composition descends towards the substrate pieces 15, the curtain or sheet 55 disperses in a direction 116 transverse to the longitudinal axis 12 of the drum cavity 10 and transverse to the direction of flow 106 of the substrate pieces 15 through the cavity 10. The transverse extent of dispersion, or the width of the curtain 55 may expand to a width which does not substantially overlap the liquid spray 52. For example, the curtain 55 may cover an arc on the inside wall 27 of the drum 5 having a central angle (the angle measured from the central longitudinal axis 12) of about 20° to about 60°.

The length of the slotted portion of the nozzle 35, and the length of the curtain or sheet 55 of particulate composition dispensed from the nozzle 35, may be at least about 20%, generally about 25% to about 60%, of the length of the rotating drum 5. For example, the length of the dispensing portion of the nozzle 35 and the length of the curtain 55 may be about 4 feet for a drum length of about 10 feet. The length of the spray 52 dispensed by the sprayer 40 may likewise be at least about 20%, generally about 25% to about 60% of the length of the rotating drum 5.

The upstream end of the particulate curtain 55 may be located at a downstream position, upstream position, or the same longitudinal position relative to the upstream end of the liquid spray 52. Also, the downstream end of the particulate curtain 55 may be located at an upstream position, the same longitudinal position, or at a downstream position relative to the downstream end of the liquid spray 52. However, the particulate nozzle 35 and the liquid adhesive sprayer 40 are coextensive so as to avoid substantial penetration of the liquid into the substrate pieces 15 before the pieces are contacted by the particulate composition. In embodiments of the present invention, the particulate curtain 55 and the liquid spray 52 may be at least about 50%, and preferably at least about 70% coextensive in length. In other embodiments of the invention, the particulate curtain 55 and liquid spray 52 may be essentially completely coextensive in length. It is generally preferred to have the liquid spray 52 contact the substrate pieces 15 just prior to contact by the particulate composition. This may be achieved by placement of the liquid adhesive sprayer 40 so as to provide a liquid spray 52 having its upstream end slightly upstream of the upstream end of the particulate composition curtain 55.

The particulate composition dispenser 70 and the liquid sprayer 40 are preferably located so as to dispense their ingredients a sufficient distance downstream of the baked good or snack inlet 20 so that the tumbling and flipping of the pieces 15 has been initiated by the time they encounter contact with either the curtain 55 of particulate composition and the spray 52 of liquid. Also, the slightly downstream location of the particulate composition curtain 55 and adhesive spray 52 relative to the baked good or snack inlet 20 helps to prevent losses of airborne particulates and spray through the inlet 20. In embodiments of the invention, vacuum hoods (not shown) may be provided adjacent the rotary drum inlet 20 and outlet 29 for the capture of any airborne particulate composition or spray escaping from the drum.

Figure 5:
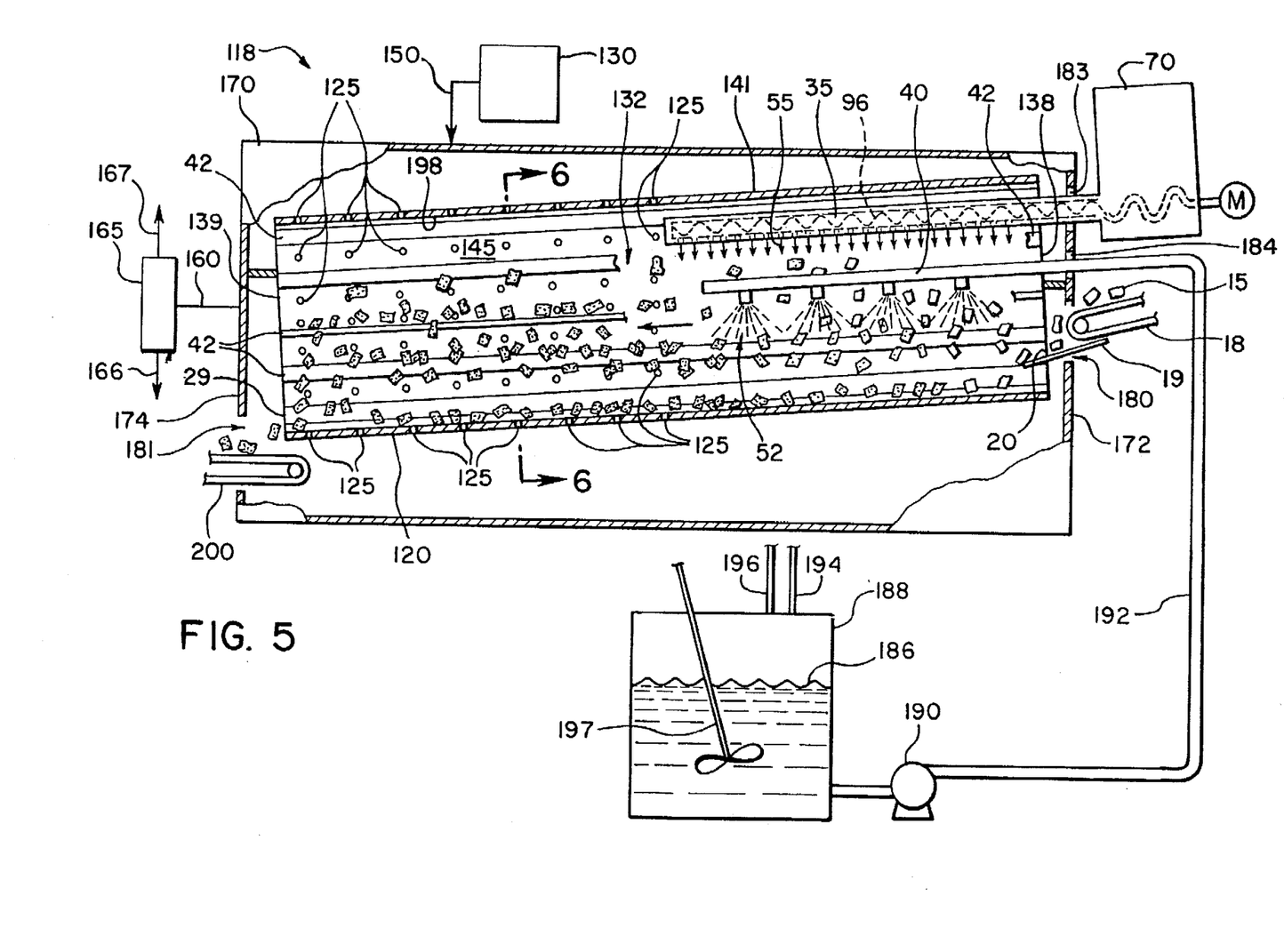
FIG. 5 is a schematic side view of another embodiment of the apparatus for the topical application of liquid adhesive and particulate compositions with side vented drying of the baked goods or snacks.
Figure 6:
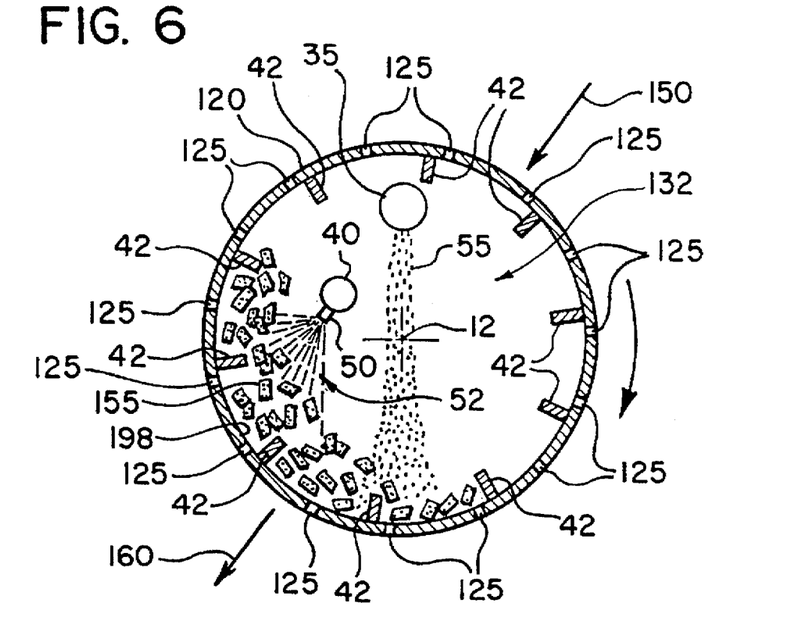
FIG. 6 is an enlarged, schematic cross-sectional view of the rotary drum of the apparatus along line 6—6 of FIG. 5.
Figure 7:
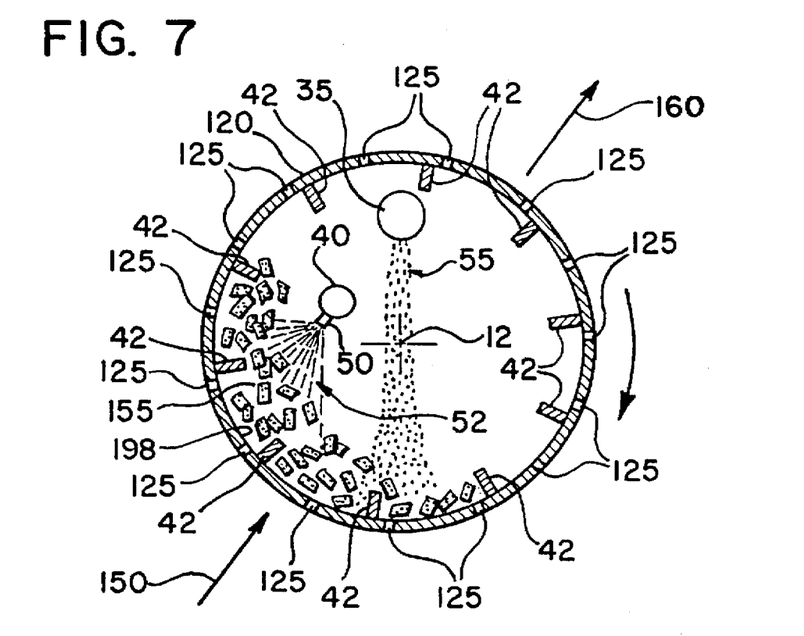
FIG. 7 is an enlarged schematic cross-sectional view of another embodiment of a side-vented rotary drum apparatus.

In embodiments where aqueous-based adhesive or binder compositions are sprayed upon the tumbling pieces, as shown in FIGS. 5, 6, and 7, the apparatus 118 preferably has an apertured rotatable drum 120. The rotatable drum 120 contains apertures or openings 125 along at least a portion of its length and around its periphery as shown in FIGS. 5, 6, and 7. Air may be forced through the apertures 125 by means of a fan 130 or other air-handling equipment into the interior or longitudinal cavity 132 of the rotatable drum 120 for continuous drying of the pieces 15 as they are tumbled. Gas heated air for drying is preferred although electrically heated air, or steam heated air may also be used.

The apertures 125 in the cylindrical wall 135 of the rotatable drum 120 may extend from the inlet end 138 to the outlet end 139. However, it is preferable to provide a non-perforated barrel section 141 concurrent with the particulate dispensing and liquid spraying section 143 of the drum 120. By including apertures 125 only in the barrel or drum section 145 which is downstream of the liquid sprayer 40 and particulate dispenser nozzle 35, disruption of the spray pattern 52 and particulate curtain 55 by the air flow entering through the apertures 125 may be at least substantially avoided. In embodiments where apertures 125 are provided in the spraying and dispensing portion 143 of the drum 120, the air flow may be reduced or substantially eliminated in that section by routing the air flow primarily or only to the downstream section 145. The use of a single rotating drum 120 having a non-perforated barrel section 141 and a downstream perforated barrel section 145 is preferred over the use of two separate rotary drums or barrels for the dispensing and drying stages. Transfer difficulties from one drum to another drum tend to occur because of clumping of the product when moistened.

Commercially available continuous side-vented pan dryers may be used in the present invention. Commercially available units which contain a rotatable, perforated drum and a heated air delivery system are produced by Wenger Manufacturing Company or Coating Machine Systems, Inc., which is now owned by Vector, Inc. In the Coating Machine Systems' unit, the drying air 150 is introduced through the side apertures 125 above the product bed 155 and is removed as exhaust air 160 from side apertures 125 located below the bed 155 as shown in FIG. 6. In the Wenger system, drying air 150 is introduced under the product bed 155 through the side apertures 125 and is removed as exhaust air 160 through side apertures 125 located above the product bed 155 as shown, for example, in FIG. 7. Particulate composition which may be entrained in the exiting air 160 may be removed by the use of filters and/or cyclone separators 165 to obtain recovered particulates 166 and purified air 167 which optionally may be recycled.

A stationary housing 170 may be provided for the rotatable apertured drum 120. The stationary housing 170 may include an inlet end wall 172 and an outlet end wall 174 which provide back pressure and resistance to flow of airborne particulates carried by the drying air. The end walls 172, 174 may be provided with appropriate openings 180, 181 for input and output of the baked good or snack pieces 15 and openings 183, 184 for the insertion of a particulate dispensing nozzle 35 and liquid sprayer 40.

As shown in FIG. 5, the liquid sprayer 40 may be supplied with an aqueous-based liquid adhesive 186 from a mixing tank 188 by means of a pump 190 and spray supply line 192. The aqueous-based liquid adhesive 186 may be prepared by mixing water 194 and solid or powdered maltodextrin 196 with mixer 197 in mixing tank 188.

In accordance with the method of the present invention, baked good pieces or snack pieces 15 may be transported from a baking oven, microwave oven, infrared oven, cooker-extruder, frier, toasting oven, drying oven, or other conventional heating device by means of a continuous belt conveyor 18 or other conveying device to a vibratory conveyor 19 or inlet hopper of the rotary drum 5, 120. The pieces may enter the rotating drum 5, 120 at elevated temperatures. For example, the adhesive and particulates may be applied to the pieces while they are at temperatures of from about 90° F. to about 190° F. or higher. Cooling of the pieces prior to entry into the rotating drum 5, 120 is not required. For example, in embodiments of the invention where the product 15 is transferred directly from a baking oven, the pieces 15 may be topped while at temperatures of at least about 145° F.

The pieces 15 entering the rotating drum 5, 120 are then transported from the baked good inlet 20 towards the baked good outlet 29 while being tumbled and flipped by the longitudinal vanes 42 and rotational motion of the drum 5, 120. The liquid adhesive composition is sprayed upon the tops and bottoms of the tumbling pieces 15 from the plurality of longitudinally arranged nozzles 50. The particulate composition is dispensed as a curtain 55 upon the tops and bottoms of the tumbling pieces 15 from the longitudinally disposed particulate dispensing nozzle 35. The particulate composition curtain 55 and the liquid adhesive spray 52 are dispensed separately in substantial side-by-side relationship without any or essentially no contact prior to contacting the baked good substrate pieces 15.

Even though the particulate composition and liquid adhesive composition are dispensed in side-by-side relationship, they are distributed substantially uniformly over the surfaces of the pieces 15. The rotary motion of the drum 5, 120 causes the pieces 15 to ride up the inner cylindrical wall 7, 198 of the drum 5, 120 and then tumble down towards the bottommost portion of the drum 5, 120. This action results in sequential contacting of the pieces 15 by the liquid adhesive composition and the particulate composition several times as the pieces 15 are tumbled and transported towards the baked good outlet 29. The multiple sequential passes through the liquid spray curtain 52 and through the particulate curtain 55 provides a plurality of layers of adhesive composition and a plurality of layers of particulate composition. Alternating of a layer of particulate composition with a layer of adhesive composition promotes strong binding of the particulates to the substrate 15 while creating an appearance of visually apparent discrete particulate pieces. The relatively short circumferential distance between the application of liquid adhesive and particulate composition causes the particulate composition to adhere to the pieces 15 prior to substantial penetration and absorption of the liquid into the pieces 15.

Downstream of the particulate dispenser nozzle 35 and liquid adhesive sprayer 40, the topped pieces 15 continue to tumble within the rotary drum 5, 120. In this downstream section of the drum 5, 120, non-adhered particles from the upstream section are caused to adhere to the pieces 15 by the tumbling action of the rotating drum 5, 120. In addition, the liquid adhesive composition tends to set and the pieces 15 may be dried to reduce stickiness. In embodiments where heated drying air is introduced through an apertured rotary drum 120, exemplary drying temperatures may range from about 125° F. to about 325° F., preferably from about 225° F. to about 275° F. depending upon the heat sensitivity of the particulate topping and the amount of water applied. The products 15 containing the particulate composition adhered to the major surfaces of the pieces may be permitted to fall from the drum outlet 29 onto a conveyor 200. The pieces may then be transported to optional drying or cooling operations and to a packaging operation.

What is claimed is:

1. A method for producing reduced fat, no-fat, or low fat baked goods or snacks comprising:

transferring baked good or snack pieces to a rotating drum, tumbling said pieces within said drum, reducing the fat content of said pieces by spraying a reduced amount of oleaginous liquid adhesive composition on the tops and bottoms of said tumbling pieces from a plurality of nozzles arranged longitudinally along a portion of the length of the drum, dispensing a particulate composition as a curtain upon the tops and bottoms of said tumbling pieces along a substantial portion of the length of the drum, said reduced amount of liquid composition being sprayed and said particulate composition being dispensed separately in substantial side-by-side relationship so that said reduced amount of liquid adhesive composition causes said particulate composition to adhere to said top and bottom surfaces without substantial penetration of said adhesive composition into said pieces so that the fat content of said pieces is reduced without loss of binding or adhesion of said particulate composition to said pieces.

2. A method as claimed in claim 1 wherein said particulate composition is applied to tumbling pieces which are located at the bottom-most portion of the drum and said adhesive composition is applied to the pieces when they are located up the inside surface of the drum.

3. A method as claimed in claim 1 wherein said pieces are at a temperature of at least about 145° F. when said adhesive and said particulate composition are applied.

4. A method as claimed in claim 1 wherein said particulate composition and said adhesive composition are each applied as a plurality of layers wherein a layer of particulate composition alternates with a layer of adhesive composition.

5. A method as claimed in claim 4 wherein a substantial portion of said particulate composition is visually apparent as discrete particles adhered to said pieces.

6. A method as claimed in claim 1 wherein said adhesive composition comprises an edible oil.

7. A method as claimed in claim 1 wherein a plurality of longitudinal vanes lift said pieces up the inside surface of said rotating drum.

8. A method as claimed in claim 1 wherein said pieces are dried while being tumbled in said drum, the drying being performed by passing air through apertures in the surface of said rotating drum.

9. A method as claimed in claim 1 wherein said pieces are crackers.

10. A method as claimed in claim 1 wherein said pieces are baked chips.

11. A method as claimed in claim 1 wherein said particulate composition is a seasoning.

12. A method for producing reduced fat, low fat, or no-fat baked goods or snacks comprising:

forming a dough into pieces, baking the pieces, continuously transporting and tumbling said baked pieces through a rotating drum, said rotating drum having longitudinally disposed vanes mounted to an inside wall for carrying said baked pieces up the inside wall of said drum as it rotates about its longitudinal axis, reducing the fat content of said baked pieces by separately applying a particulate composition and a reduced amount of oleaginous liquid adhesive composition to said baked pieces along a substantial length of said rotating drum so that said reduced amount of liquid adhesive composition causes said particulate composition to adhere to said baked pieces without substantial penetration of said adhesive composition into said baked pieces and without loss of binding or adhesion of said particulate composition to said baked pieces as they are transported and tumbled in the rotating drum, said liquid adhesive composition being applied by spraying the baked pieces when they are located at a higher position up said inside wall than when said particulate composition is applied to said pieces, said liquid adhesive composition and said particulate composition being applied along substantially the same length of said drum.

13. A method as claimed in claim 12 wherein said liquid adhesive comprises oil.

14. A method as claimed in claim 12, wherein said pieces are dried within said drum by passing air through apertures in the wall of said drum.

15. A method for producing reduced fat, no-fat, or low fat baked goods or snacks comprising:

transferring baked good or snack pieces to a rotating drum, tumbling said pieces within said drum, reducing the fat content of said pieces by replacing an oil-based spraying medium with an aqueous-based liquid adhesive composition and spraying said aqueous-based liquid adhesive composition upon the tops and bottoms of said tumbling pieces from a plurality of nozzles, separately dispensing a particulate composition as a curtain upon the tops and bottoms of the pieces as they are tumbled so that said aqueous-based liquid adhesive composition causes said particulate composition to adhere to said top and bottom surfaces without substantial penetration of said adhesive composition into said pieces and without loss of binding or adhesion of said particulate composition to said pieces, and drying the pieces while being tumbled, the drying being performed by passing air through apertures in the surface of the rotating drum.

16. A method as claimed in claim 15 wherein said particulate composition is applied to tumbling pieces which are located at the bottom-most portion of the drum and said adhesive composition is applied to the pieces when they are located up the inside surface of the drum.

17. A method as claimed in claim 15 wherein said pieces are dried at a temperature of about 125° F. to about 325° F.

18. A method as claimed in claim 15 wherein said adhesive composition comprises water and a maltodextrin.

19. A method as claimed in claim 15 wherein said pieces are baked chips.

20. A method as claimed in claim 19 wherein said particulate composition is a seasoning.

21. A method as claimed in claim 15 wherein said drying and particulate dispensing are performed in the same section of the rotating drum.

22. A method as claimed in claim 15 wherein said drying is performed downstream of the section of the rotating drum where said particulate curtain is dispensed.

23. A method as claimed in claim 15 wherein the liquid adhesive composition is sprayed and the particulate composition is dispensed in a non-perforated barrel section of the rotating drum, and said drying is performed in a perforated barrel section downstream of said non-perforated barrel section, said perforated barrel section having a plurality of apertures along its length and around its periphery.

* * * * *